United States Patent
Yamaguchi et al.

(10) Patent No.: US 11,084,940 B2
(45) Date of Patent: Aug. 10, 2021

(54) COMPOSITION, CURED PRODUCT, STORAGE CONTAINER, IMAGE FORMING APPARATUS, AND IMAGE FORMING METHOD

(71) Applicants: Tatsuki Yamaguchi, Kanagawa (JP); Masahide Kobayashi, Kanagawa (JP); Mitsunobu Morita, Shizuoka (JP); Takashi Okada, Kanagawa (JP); Soh Noguchi, Kanagawa (JP); Takenori Suenaga, Kanagawa (JP)

(72) Inventors: Tatsuki Yamaguchi, Kanagawa (JP); Masahide Kobayashi, Kanagawa (JP); Mitsunobu Morita, Shizuoka (JP); Takashi Okada, Kanagawa (JP); Soh Noguchi, Kanagawa (JP); Takenori Suenaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 21 days.

(21) Appl. No.: 16/441,796

(22) Filed: Jun. 14, 2019

(65) Prior Publication Data
US 2020/0032068 A1 Jan. 30, 2020

(30) Foreign Application Priority Data

Jul. 30, 2018 (JP) ............... JP2018-142149
Apr. 1, 2019 (JP) ............... JP2019-069961

(51) Int. Cl.
| C09D 4/00 | (2006.01) |
| C08F 220/58 | (2006.01) |
| C09D 11/30 | (2014.01) |
| C09D 11/101 | (2014.01) |
| B33Y 10/00 | (2015.01) |
| B33Y 70/00 | (2020.01) |
| B29C 64/112 | (2017.01) |
| B29C 64/255 | (2017.01) |
| B41M 5/00 | (2006.01) |
| B33Y 30/00 | (2015.01) |
| B29K 33/00 | (2006.01) |

(52) U.S. Cl.
CPC .............. *C09D 4/00* (2013.01); *B29C 64/112* (2017.08); *B29C 64/255* (2017.08); *B33Y 10/00* (2014.12); *B33Y 30/00* (2014.12); *B33Y 70/00* (2014.12); *B41M 5/0023* (2013.01); *C08F 220/58* (2013.01); *C09D 11/101* (2013.01); *C09D 11/30* (2013.01); *B29K 2033/26* (2013.01)

(58) Field of Classification Search
CPC ..................................................... C08F 220/58
See application file for complete search history.

(56) References Cited

U.S. PATENT DOCUMENTS

| 10,174,215 B2 | 1/2019 | Morita et al. |
| 2017/0058135 A1 | 3/2017 | Kohzuki et al. |
| 2017/0253680 A1 | 9/2017 | Yamada |
| 2017/0260405 A1 | 9/2017 | Kumai et al. |
| 2017/0327705 A1 | 11/2017 | Yamada |
| 2018/0127607 A1 | 5/2018 | Morita et al. |
| 2018/0333909 A1 | 11/2018 | Arita et al. |
| 2019/0023924 A1 | 1/2019 | Yamada |
| 2019/0284409 A1* | 9/2019 | Matsushita ............ B41J 11/002 |

FOREIGN PATENT DOCUMENTS

| JP | 2016-172841 | 9/2016 |
| JP | 2017-019939 | 1/2017 |

* cited by examiner

*Primary Examiner* — Wenwen Cai
(74) *Attorney, Agent, or Firm* — Oblon, McClelland, Maier & Neustadt, L.L.P.

(57) ABSTRACT

Provided is a composition including an acrylamide compound having a molecular weight of 150 or greater but 250 or less (A1), a polyfunctional polymerizable compound including an alkylene oxide group (A2), and a polyfunctional polymerizable compound (A3) different from the polyfunctional polymerizable compound (A2).

12 Claims, 2 Drawing Sheets

COMPOSITION, CURED PRODUCT, STORAGE CONTAINER, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2018-142149 filed Jul. 30, 2018 and Japanese Patent Application No. 2019-069961 filed Apr. 1, 2019. The contents of which are incorporated herein by reference in their entirety.

BACKGROUND OF THE INVENTION

Field of the Invention

The present disclosure relates to a composition, a cured product, a storage container, an image forming apparatus, and an image forming method.

Description of the Related Art

Recently, curable compositions are desired to have various properties, such that printing or coating can be performed on building materials or automobiles, and moreover the curable compositions can be stretchable by heating for shaping.

A cured film of a curable composition known in the art has high hardness of the coating film. When processing, such as stretching, is performed after curing, therefore, the cured film cannot correspond to the shape change of a base material, the stretchability of the cured product is low, and hence desired processing cannot be performed. Accordingly, proposed is, for example, an active energy ray curable composition including a monofunctional photopolymerizable compound having a low glass transition temperature and a monofunctional photopolymerizable compound having a high glass transition temperature (see, for example, Japanese Unexamined Patent Application Publication No. 2016-172841).

Moreover, proposed is an active energy ray curable composition including two or more monofunctional polymerizable compounds and a polyfunctional polymerizable compound, where the polyfunctional polymerizable compound is a polymerizable compound A that has 2 or 3 functional groups and a number average molecular weight of 500 or greater but 5,000 or less, and has a glass transition temperature of 40° C. or higher when the polyfunctional polymerizable compound is polymerized alone, an amount of the monofunctional polymerizable compounds is 60% by mass or greater but 75% by mass or less, and an amount of the polymerizable compound A is 3% by mass or greater but 12% by mass or less (see, for example, Japanese Unexamined Patent Application Publication No. 2017-019939).

SUMMARY OF THE INVENTION

According to one aspect of the present disclosure, a composition includes an acrylamide compound having a molecular weight of 150 or greater but 250 or less (A1), a polyfunctional polymerizable compound including an alkylene oxide group (A2), and a polyfunctional polymerizable compound (A3) different from the polyfunctional polymerizable compound (A2).

DESCRIPTION OF THE EMBODIMENTS (Composition)

A composition of the present disclosure includes an acrylamide compound having a molecular weight of 150 or greater but 250 or less (A1), a polyfunctional polymerizable compound including an alkylene oxide group (A2), and a polyfunctional polymerizable compound (A3) different from the polyfunctional polymerizable compound (A2). The composition may further include other components according to the necessity.

The present disclosure has an object to provide a composition that can form a cured product having excellent stretchability and abrasion resistance.

The present disclosure can provide a composition that can form a cured product having excellent stretchability and abrasion resistance.

The composition of the present disclosure has accomplished based on the following insights. In the related art, a cured product is formed using a monofunctional monomer having a low glass transition temperature, and therefore strength or abrasion resistance of the resultant cured product is significantly reduced. As a result, the cured product having excellent stretchability and abrasion resistance cannot be obtained. When an amount of a polyfunctional polymerizable compound for use is small, moreover, abrasion resistance of the cured product becomes insufficient.

Since the composition of the present disclosure includes an acrylamide compound having a molecular weight of 150 or greater but 250 or less (A1), a polyfunctional polymerizable compound including an alkylene oxide group (A2), and a polyfunctional polymerizable compound (A3) different from the polyfunctional polymerizable compound (A2), a cured product having both high stretchability and a degree of abrasion resistance that is equivalent of that of hard coating can be obtained.

The composition of the present disclosure is preferably a curable composition. Examples of the curable composition include a heat-curable composition and an active energy ray-curable composition. Among the above-listed examples, an active energy ray-curable composition is more preferable.

<Acrylamide Compound (A1)>

The acrylamide compound (A1) includes an acrylamide group and an ester structure and has a molecular weight of 150 or greater but 250 or less.

The molecular weight of the acrylamide compound (A1) is 150 or greater but 250 or less, and preferably 150 or greater but 200 or less. The molecular weight thereof being 150 or greater is preferable because odor generated by evaporation of the compound can be suppressed, and stability of inkjet ejection can be improved. The molecular weight thereof being 250 or less is preferable because curability of the composition becomes excellent, strength of a cured product improves, and moreover, viscosity of the composition is prevented from being too high.

In the present specification, (meth)acrylic acid ester means acrylic acid ester or methacrylic acid ester. (Meth) acrylate means acrylate or methacrylate.

The acrylamide compound (A1) is preferably a compound represented by General Formula (1), or General Formula (2), or both, more preferably a compound represented by General Formula (1) or General Formula (2), and even more preferably a compound represented by General Formula (1).

$CH_2=CH-CO-N(R^1)-R^2-CO-O-R^3$  General Formula (1)

In General Formula (1), $R^1$ is a hydrogen atom or a straight chain or branched alkyl group having from 1 through 4 carbon atoms, and is preferably a straight chain or branched alkyl group having from 1 through 4 carbon atoms. Examples of $R^1$ include a methyl group, an ethyl group, a propyl group, an isopropyl group, a butyl group, a sec-butyl group, an isobutyl group, and a tert-butyl group.

In General Formula (1), $R^2$ is a straight chain or branched alkylene group having from 1 through 4 carbon atoms. Examples of $R^2$ include a methylene group, an ethane-1,1-diyl group, an ethane-1,2-diyl group, a propane-1,1-diyl group, a propane-1,2-diyl group, a propane-1,3-diyl group, a butane-1,1-diyl group, a butane-1,2-diyl group, a butane-1,3-diyl group, a butane-1,4-diyl group, a 2-methylpropane-1,1-diyl group, a 2-methylpropane-1,2-diyl group, and a 2-methylpropane-1,3-diyl group.

In General Formula (1), $R^3$ is a straight chain or branched alkyl group having from 1 through 4 carbon atoms. Examples of $R^3$ include a methyl group, an ethyl group, a propyl group, an isopropyl group, a butyl group, a sec-butyl group, an isobutyl group, and a tert-butyl group.

Note that, the total number of carbon atoms of $R^1$, $R^2$, and $R^3$ is from 2 through 6.

General Formula (2)

In General Formula (2), a ring X is a cyclic structure that includes a nitrogen atom and has from 2 through 5 carbon atoms. Examples of the ring X include aziridine, azetidine, pyrrolidine, and piperidine. Among the above-listed examples, pyrrolidine and piperidine are preferable.

In General Formula (2), $R^4$ is a single bond or a straight chain or branched alkylene group having from 1 through 3 carbon atoms. Examples of $R^4$ include a single bond, a methylene group, an ethane-1,1-diyl group, an ethane-1,2-diyl group, a propane-1,1-diyl group, a propane-1,2-diyl group, and a propane-1,3-diyl group.

In General Formula (2), $R^5$ is a straight chain or branched alkyl group having from 1 through 3 carbon atoms. Examples of $R^5$ include a methyl group, an ethyl group, a propyl group, and an isopropyl group.

Note that, the total amount of carbon atoms of the ring X, $R^4$, and $R^5$ is from 3 through 6.

Examples of a compound represented by General Formula (1) or (2) include N-acryloyl-N-alkylamino acid alkyl ester (including N-acryloylproline alkyl ester), and N-acryloylpiperidine carboxylic acid alkyl ester. The alkyl group in this paragraph means a straight chain or branched alkyl group having from 1 through 4 carbon atoms, and is preferably an alkyl group having 1 or 2 carbon atoms (i.e., a methyl group or an ethyl group).

The N-acryloyl-N-alkylamino acid alkyl ester is not particularly limited and may be appropriately selected depending on the intended purpose. Examples thereof include N-acryloyl-N-methylglycine methyl ester, N-acryloyl-N-methylglycine ethyl ester, N-acryloyl-N-methylglycine propyl ester, N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester. The above-listed examples may be used alone or in combination.

The N-acryloylpiperidine carboxylic acid alkyl ester is not particularly limited and may be appropriately selected depending on the intended purpose. Examples thereof include methyl N-acryloylpiperidine-2-carboxylate, methyl N-acryloylpiperidine-3-carboxylate, and methyl N-acryloylpiperidine-4-carboxylate. The above-listed examples may be used alone or in combination.

In order to apply for an inkjet printing system, the acrylamide compound (A1) is preferably a colorless transparent or pale yellow transparent liquid having low viscosity (100 mPa·s or less) at room temperature (25° C.). For safety of users, moreover, the acrylamide compound (A1) is preferably a compound that does not exhibit strong acidity or basicity, and is free of harmful formaldehyde as impurities.

An amount of the acrylamide compound (A1) is preferably 20% by mass or greater but 98% by mass or less, more preferably 40% by mass or greater but 97% by mass or less, and further more preferably 64.8% by mass or greater but 96.8% by mass or less relative to a total amount of the composition.

<Polyfunctional Polymerizable Compound Including Alkylene Oxide Group (A2)>

Examples of the polyfunctional polymerizable compound including an alkylene oxide group (A2) include bisphenol A propylene oxide (PO) adduct di(meth)acrylate, ethoxylated neopentyl glycol di(meth)acrylate, propoxylated neopentyl glycol di(meth)acrylate, polyethylene glycol di(meth)acrylate, polypropylene glycol di(meth)acrylate, bisphenol A ethylene oxide (EO) adduct di(meth)acrylate, EO-modified pentaerythritol tri(meth)acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra(meth)acrylate, PO-modified dipentaerythritol tetra(meth)acrylate, EO-modified trimethylolpropane tri(meth)acrylate, PO-modified trimethylolpropane tri(meth)acrylate, EO-modified tetramethylol methane tetra(meth)acrylate, PO-modified tetramethylol methane tetra(meth)acrylate, and caprolactone-modified dipentaerythritol hexa(meth)acrylate. The above-listed examples may be used alone or in combination.

Among the above-listed examples, a Bifunctional compound, such as polypropylene glycol di(meth)acrylate is preferable in view of excellent stretchability.

An amount of the polyfunctional polymerizable compound including an alkylene oxide group (A2) is preferably 10% by mass or greater but 30% by mass or less, more preferably 15% by mass or greater but 25% by mass or less, relative to a total amount of the composition. When the amount of the polyfunctional polymerizable compound including an alkylene oxide group (A2) is in the range of 10% by mass or greater but 30% by mass or less, both stretchability and abrasion resistance can be achieved.

When the amount of the polyfunctional polymerizable compound (A2) is less than 10% by mass, sufficient stretchability may not be obtained. When the amount of the polyfunctional polymerizable compound (A2) is greater than 30% by mass, on the other hand, strength of a resultant cured product, which affects abrasion resistance thereof, may be reduced.

As a length of an alkylene oxide chain of the polyfunctional polymerizable compound including an alkylene oxide group (A2), the number of an alkylene oxide repeating units in the alkylene oxide chain is preferably 3 or greater but 13 or less, and more preferably 10 or greater but 13 or less in view of stretchability. When the number of the alkylene oxide repeating units in the alkylene oxide chain is greater than 13, abrasion resistance may be reduced due to low strength of a cured product.

<Polyfunctional Polymerizable Compound (A3) Different from Polyfunctional Polymerizable Compound Including Alkylene Oxide Group (A2)>

Examples of the polyfunctional polymerizable compound (A3) include pentaerythritol tri(meth)acrylate, pentaerythritol tetra(meth)acrylate, dipentaerythritol tetra(meth)acrylate, trimethylolpropane tri(meth)acrylate, tetramethylol methane tetra(meth)acrylate, trimethylol ethane tri(meth)acrylate, trimethylolpropane tri(meth)acrylate, bis(4-(meth)acryloxypolyethoxyphenyl)propane, diallyl phthalate, triallyl trimellitate, 1,6-hexanediol di(meth)acrylate, 1,9-nonanediol di(meth)acrylate, 1,3-butyleneglycol di(meth)acrylate, 1,10-decanediol di(meth)acrylate, neopentyl glycol hydroxypivalate di(meth)acrylate, tetramethylol methane tri(meth)acrylate, dimethylol tricyclodecane di(meth)acrylate, modified glycerin tri(meth)acrylate, bisphenol A diglycidyl ether (meth)acrylic acid adducts, modified bisphenol A di(meth)acrylate, dipentaerythritol hexa(meth)acrylate, pentaerythritol tri(meth)acrylatetolylene diisocyanate urethane prepolymers, pentaerythritol tri(meth)acrylate hexamethylene diisocyanate urethane prepolymers, ditrimethylolpropane tetra(meth)acrylate, and pentaerythritol tri(meth)acrylate hexamethylene diisocyanate urethane prepolymers. The above-listed examples may be used alone or in combination.

Among the above-listed examples, dimethylol tricyclodecane di(meth)acrylate having an alicyclic structure in view of excellent abrasion resistance.

As the polyfunctional polymerizable compound (A3), a polyfunctional oligomer may be used. The polyfunctional oligomer is not particularly limited and may be appropriately selected depending on the intended purpose. As the polyfunctional oligomer, a urethane oligomer is preferably used.

A commercial product can be used as the urethane oligomer. Examples of the commercial product include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 available from Nippon Synthetic Chemical Industry Co., Ltd.; CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 available from SARTOMER; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 available from Daicel-Cytec Co., Ltd. The above-listed examples may be used alone or in combination.

An amount of the polyfunctional polymerizable compound (A3) different from the polyfunctional polymerizable compound including an alkylene oxide group (A2) is preferably 5% by mass or greater but 20% by mass or less, and more preferably 5% by mass or greater but 10% by mass or less, relative to a total amount of the composition. When the amount of the polyfunctional polymerizable compound (A3) is 5% by mass or greater, sufficient strength can be obtained. When the amount of the polyfunctional polymerizable compound (A3) is 20% by mass or less, moreover, a resultant cured product has excellent stretchability.

<Polymerizable Compounds Other than Acrylamide Compound Having Molecular Weight of 150 or Greater but 250 or Less (A1), Polyfunctional Polymerizable Compound Including Alkylene Oxide Group (A2), and Polyfunctional Polymerizable Compound (A3) Different from Polyfunctional Polymerizable Compound Including Alkylene Oxide Group (A2)>

The composition of the present disclosure may include other polymerizable compounds than the acrylamide compound having a molecular weight of 150 or greater but 250 or less (A1), the polyfunctional polymerizable compound including an alkylene oxide group (A2), and the polyfunctional polymerizable compound (A3) different from the polyfunctional polymerizable compound including an alkylene oxide group (A2).

As the above-mentioned other polymeric compounds, polymeric monomers know in the art, such as (meth)acrylic acid esters, can be used. Examples thereof include methyl (meth)acrylate, ethyl (meth)acrylate, n-butyl (meth)acrylate, allyl (meth)acrylate, glycidyl (meth)acrylate, 2-(dimethylamino)ethyl (meth)acrylate, 2-hydroxyethyl (meth)acrylate, 2-butoxyethyl (meth)acrylate, ethylcarbitol (meth)acrylate, cyclohexyl (meth)acrylate, tetrahydrofurfuryl (meth)acrylate, 2-(2-vinyloxyethoxy)ethyl(meth)acrylate, benzyl (meth)acrylate, 2-phenoxyethyl(meth)acrylate, 2-hydroxy-3-phenoxypropyl(meth)acrylate, isobornyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, and 1,9-nonanediol di(meth)acrylate. The above-listed examples may be used alone or in combination.

In addition to the (meth)acrylic acid esters, examples of the above-mentioned other polymerizable compounds include N-vinyl compounds (e.g., N-vinylcaprolactam, N-vinylpyrrolidone, and N-vinylformamide), aromatic vinyl compounds (e.g., styrene, and α-methylstyrene), vinyl ethers (e.g., diethylene glycol divinyl ether, triethylene glycol divinyl ether, and cyclohexane dimethanol divinyl ether), and allyl compounds (e.g., allyl glycidyl ether, diallyl phthalate, and triallyl trimellitate.

Note that, the above-mentioned arylamide compound that does not include an ester structure is also used as the above-mentioned other polymerizable compounds.

<Polymerization Initiator>

The composition of the present disclosure may include a polymerization initiator. Note that, the polymerization initiator may be simply referred to as an initiator. As the polymerization initiator, there are a heat polymerization initiator and a photopolymerization initiator.

The photopolymerization initiator is not particularly limited as long as the photopolymerization initiator is capable of generating active species, such as radicals and cations, and inducing polymerization of a polymerizable compound (e.g., a monomer and an oligomer). As the photopolymerization initiator, any of radical polymerization initiators, cation polymerization initiators, base generators, etc., can be used alone or in combination. Among the above-listed examples, a radical polymerization initiator is preferable.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

The radical polymerization initiator is not particularly limited and may be appropriately selected depending on the intended purpose. Examples thereof include polyethylene glycol 200-di(β-4-(2-dimethylamino-2-benzyl)butanonylphenyl)piperazine) (Omnipol 910, available from IGM), 1,3-di({α-[1-chloro-9-oxo-9H-thioxanthen-4-yl)oxy]acetylpoly[oxy(1-methylethylene)]}oxy)-2,2-bis({α-[1-chloro-9-oxo-9H-thioxanthen-4-yl)oxy]acetylpoly[oxy(1-methylethylene)]}oxymethyl)propane (Speedcure7010, available from Lambson), a mixture of 1,3-di({α-4-(dimethylamino)benzoylpoly[oxy(1-methylethylene)]}oxy)-2,2-bis({α-4-(dimethylamino)benzoylpoly[oxy(1-methylethylene)]}oxymethyl)propane and {α-4-(dimethylamino)benzoylpoly(oxyethylene)-poly[oxy(1-methylethylene)]-poly(oxyethylene)}4-(dimethylamino)benzoate (Speedcure7040, available from Lambson), polybutylene glycol bis(9-oxo-9H-thioxanthinyloxy)acetate (Omnipol TX, available from IGM), a polymeric thioxanthene compound (Genepol TX-2, available from Lahn AG), and an oligomer of 2-hydroxy-1-(4-isopropenylphenyl)-2-methylpropan-1-one (Esacure ONE, available from IGM). The above-listed examples may be used alone or in combination.

In order to obtain sufficient curing speed, an amount of the polymerization initiator is preferably 1% by mass or greater but 20% by mass or less, more preferably 5% by mass or greater but 10% by mass or less relative to a total amount of the composition.

In addition to the polymerization initiator, a polymerization accelerator (sensitizer) may be used in combination. The polymerization accelerator is not particularly limited. Examples of the polymerization accelerator include amine compounds, such as trimethyl amine, methyl dimethanol amine, triethanol amine, p-diethylaminoacetophenone, ethyl p-dimethylaminobenzoate, 2-ethylhexyl-p-dimethylaminobenzoate, and N,N-dimethylbenzylamine-4,4'-bis(diethylamino)benzophenone.

An amount of the polymerization accelerator may be appropriately set depending on a polymerization initiator for use or an amount of the polymerization initiator.

<Coloring Material>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof.

A content of the colorant in the composition is not particularly limited, and may be appropriately determined considering, for example, a desired color density and dispersibility of the colorant in the composition. However, it is preferably from 0.1% by mass to 20% by mass relative to the total mass of the composition. Incidentally, the composition of the present disclosure does not necessarily contain a colorant but can be clear and colorless. In such a case, for example, such a clear and colorless composition is good for an overcoating layer to protect an image.

The pigments include inorganic pigments and organic pigments. These can be used alone or in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The composition of the present disclosure optionally contains other known components. The other known components are not particularly limited. Specific examples thereof include, but are not limited to, surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

Note that, each component in the composition can be analyzed as follows. Low molecular weight components, such as a polymerization monomer and a polymerization initiator, can be determined by gas chromatography mass spectrometry. A principle skeleton of a polymer component or an amount of chlorine atoms therein can be determined by infrared spectroscopy or elemental analysis by precipitating and separating the polymer component using a poor solvent, such as methanol.

<Preparation of Composition>

The composition of the present disclosure can be prepared by using the components described above. The preparation devices and conditions are not particularly limited. For example, the composition can be prepared by subjecting the acrylamide compound (A1) having a molecular weight of 150 or greater but 250 or less, the polyfunctional polymerizable compound including an alkylene oxide group, the polyfunctional polymerizable compound (A3) different from the polyfunctional polymerizable compound (A2), a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above.

Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Curing Unit>

Examples of a curing unit configured to cure the composition of the present disclosure include a curing unit configured to cure through heat curing or irradiation with active energy rays. Among them, curing is preferably performed by irradiation with active energy rays.

Specific examples of the active energy ray for curing the curable composition include, but are not limited to, electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

Among the above-listed examples, ultraviolet rays having a peak in the wavelength range of 285 nm or longer but 405 nm or shorter (preferably 365 nm or longer but 405 nm or shorter) emitted from a UV ray emitting diode (may be also referred to as UV-LED hereinafter) are preferable in view of energy saving and downsizing of a device. Note that, a light absorption spectrum of the polymerization initiator is typically broad. Use of UV-LED emitting a very narrow certain wavelength range make improvement of curability of the composition difficult. Therefore, use of the composition of the present disclosure, which has excellent curability even with UV-LED, is preferable.

<Application Field>

The application field of the composition of the present disclosure is not particularly limited. It can be applied to any field where active energy ray curable compositions are used. For example, the composition is selected to a particular application and used for a resin for processing, a paint, an adhesive, a covering material, an insulant, a releasing agent, a coating material, a sealing material, various resists, and various optical materials.

Figure 2:
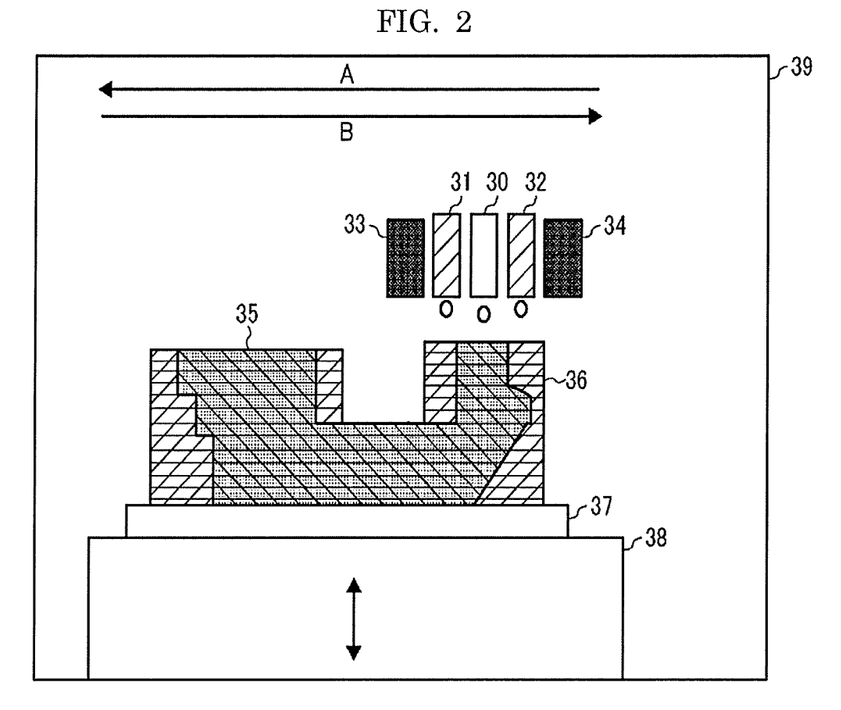
FIG. 2 is a schematic view illustrating an example of another image forming apparatus (apparatus for forming 3D object)
Figure 3:
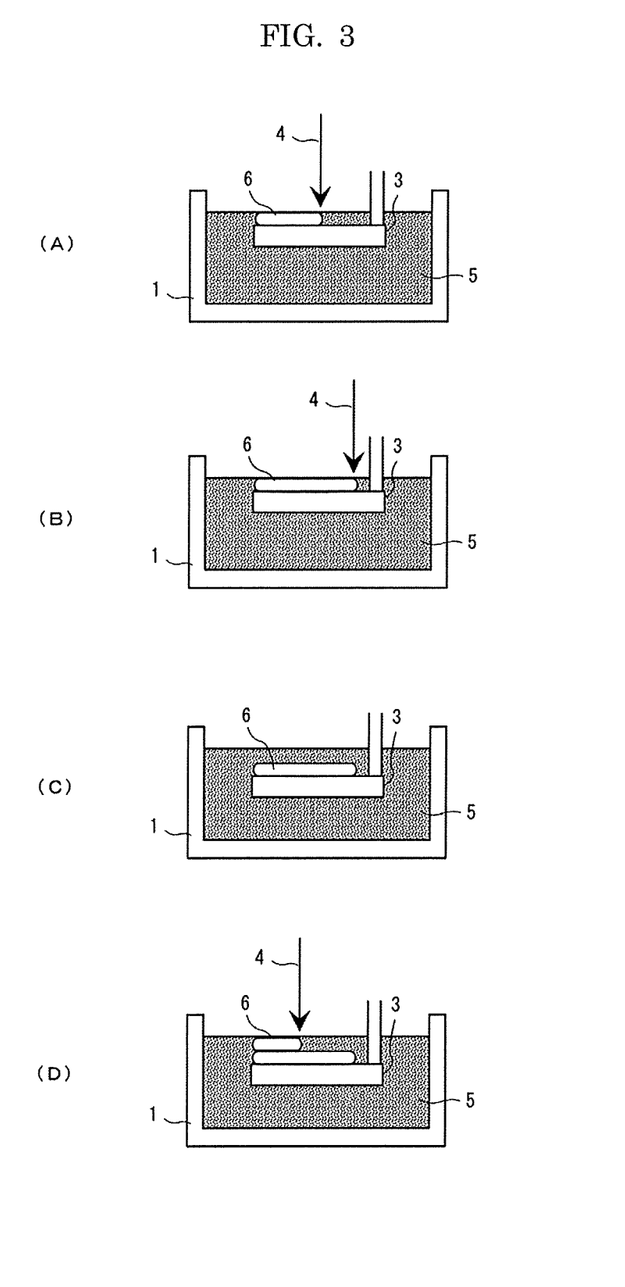
FIG. 3 is a schematic view for illustrating an example of a method for performing solid modeling using a composition.

Furthermore, the curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, and FIG. 3. FIG. 2 is a diagram illustrating a method of additive manufacturing to sequentially form layers of the curable composition of the present disclosure one on top of the other by repeating discharging the curable composition to particular areas followed by curing upon irradiation of an active energy ray. FIG. 3 is a diagram illustrating a method of additive manufacturing to sequentially form cured layers 6 having respective predetermined forms one on top of the other on a movable stage 3 by irradiating a storing pool (storing part) 1 of the composition 5 of the present disclosure with the active energy ray 4.

An apparatus for fabricating a three-dimensional object by the composition of the present disclosure is not particularly limited and can be a known apparatus. For example, the apparatus includes a containing device, a supplying device, and a discharging device of the composition, and an active energy ray irradiator.

In addition, the present disclosure includes cured materials obtained by curing the curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<<Storage Container>>

The storage container of the present disclosure contains the curable composition and is suitable for the applications as described above. For example, if the curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<<Image Forming Method and Image Forming Apparatus>>

The image forming method of the present disclosure may use active energy rays or heating. In order to cure the composition of the present disclosure with active energy rays, the image forming method includes an irradiating step including applying active energy rays, and the image forming apparatus of the present disclosure includes an irradiation unit configured to apply active energy rays, and a container configured to store therein the composition of the present disclosure. The container may store the container described above. Moreover, the image forming method and image forming apparatus may further include an ejection step and an ejection unit configured to eject the composition of the present disclosure, respectively. A method for ejecting the composition is not particularly limited. Examples thereof include continuous jet and on-demand ejection. Examples of the on-demand ejection include a piezo system, a thermal system, and an electrostatic system.

Figure 1:
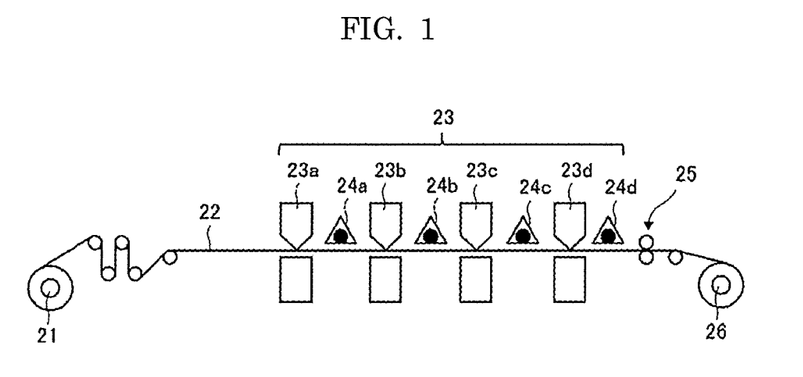
FIG. 1 is a schematic view illustrating an example of an image forming apparatus including an inkjet ejection unit.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or composite materials thereof, each of which may be in the form of a sheet. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24c1. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for forming ejects a first composition, and ejection head units 31 and 32 for a support ejects a second composition having a different composition from the first composition, while ultraviolet irradiators 33 and 34 adjacent to the ejection head units 31 and 32 cure the compositions. To be more specific, for example, after the ejection head units 31 and 32 for a support eject the second composition onto a substrate 37 for forming and the second composition is solidified by irradiation of an active energy ray to form a first substrate having a space for a composition, the ejection head unit 30 for forming ejects the first composition onto the pool followed by irradiation of an active energy ray for solidification, thereby forming a first formed layer. This step is repeated multiple times lowering the stage 38 movable in the vertical direction to laminate the support layer and the formed layers to fabricate a solid object 35. Thereafter, the laminated support part 36 is removed, if desired. Although only a single ejection head unit 30 for forming is provided to the image forming apparatus 39 illustrated in FIG. 2, it can have two or more units 30.

EXAMPLES

The present disclosure will be described more specifically below by way of Examples. The present disclosure should not be construed as being limited to these Examples.

<Constitutional Components of Composition>

Symbols, compound names, and manufacturers' names of raw materials used for preparing compositions are presented in Table 1.

Raw materials that were not commercially available were synthesized according to the methods described in Synthesis Examples 1 to 7. The identification of the synthesized compound was performed by nuclear magnetic resonance spectroscopy (device for use: JNM-ECX500, available from JEOL Ltd.), and the measurement of the purity was performed by gas chromatography (device for use: GCMS-QP2010 Plus, available from Shimadzu Corporation). The above-mentioned chemical analysis methods were performed by conventional methods.

TABLE 1

| | Symbol | Compound name or structure | Product name (manufacturer's name) |
|---|---|---|---|
| Acrylamide compound (A1) | A1-1 | (structure) | See Synthesis Ex. 1 |
| | A1-2 | (structure) | See Synthesis Ex. 2 |
| | A1-3 | (structure) | See Synthesis Ex. 3 |
| | A1-4 | (structure) | See Synthesis Ex. 4 |
| | A1-5 | (structure) | See Synthesis Ex. 5 |
| | A1-6 | (structure) | See Synthesis Ex. 6 |
| | A1-7 | (structure) | See Synthesis Ex. 7 |
| | A1-8 | Acryloyl morphine (molecular weight: 141.2) | ACMO (KJ Chemical) |
| | A1-9 | N, N', N''- triacryloyldiethylenetriamine (molecular weight: 265.3) | FAM-301 (Fuji Film) |
| Polyfunctional polymerizable compound including alkylene oxide group (A2) | A2-1 | Dipropylene glycol diacrylate (chain length: 2) | APG100 (Shin Nakamura Chemical Co., Ltd.) |
| | A2-2 | Tripropylene glycol diacrylate (chain length: 3) | APG200 (Shin Nakamura Chemical Co., Ltd.) |
| | A2-3 | Polypropylene glycol diacrylate (chain length: 7) | APG400 (Shin Nakamura Chemical Co., Ltd.) |
| | A2-4 | Polypropylene glycol diacrylate (chain length: 12) | APG700 (Shin Nakamura Chemical Co., Ltd.) |
| | A2-5 | Polypropylene glycol dimethacrylate (chain length: 14) | 14G (Shin Nakamura Chemical Co., Ltd.) |

TABLE 1-continued

| | Symbol | Compound name or structure | Product name (manufacturer's name) |
|---|---|---|---|
| Polyfunctional polymerizable compound (A3) different from (A2) | A3-1 | Caprolactone-modified dipentacrythrytol hexaacrylate | DPC A60 (Nippon Kayaku Co., Lid.) |
| | A3-2 | Dipentaerythrytol hexaacrylate | DPHA (Sartomor) |
| | A3-3 | Dimethylol tricyclodecane dimethacrylate | DCP (Shin Nakamura Chemical Co., Ltd.) |
| | A3-4 | Difunctional urethane acrylate oligomer | CN983 (Sartomor) |

*Polymerization initiator: oligomer of 2-hydroxy-1-(4-isopropenylphenyl)-2-methylpropan-1-one ("Esacure ONE" available from IGM)
*Polymerization inhibitor: 4-methoxyphenol (product name: "METHOQUINONE," available from Seiko Chemical Co., Ltd.)

Synthesis Example 1

Synthesis of N-acryloyl-N-methylglycine methyl ester (A1-1)

N-methylglycine methyl ester hydrochloride (reagent, available from Sigma-Aldrich Co., LLC.) in an amount of 0.30 mol, 0.45 mol of potassium carbonate (reagent, available from KANTO CHEMICAL CO., INC.), and 400 mL of water were stirred and mixed at a temperature of from 0° C. through 10° C. With maintaining the temperature, 0.33 mol of acrylic acid chloride (reagent, available from Wako Pure Chemical Industries, Ltd.) was slowly dripped. After completing the dripping, extraction was performed 3 times with 400 mL of ethyl acetate (reagent, available from KANTO CHEMICAL CO., INC.), and the resultant ethyl acetate layers were combined and washed with 400 mL of water once. The ethyl acetate was removed under the reduced pressure at 40° C., to thereby obtain 0.20 mol of targeted N-acryloyl-N-methylglycine methyl ester (A1-1) as a substantially colorless transparent liquid. The purity thereof was 98.3% by mass.

Note that, a molecular weight of N-acryloyl-N-methylglycine methyl ester (A1-1) was 157.2. N-acryloyl-N-methylglycine methyl ester (A1-1) is a known compound (CAS registry number: 72065-23-7).

Synthesis Example 2

Synthesis of N-acryloyl-N-isopropylglycine isopropyl ester (A1-2)

Targeted N-acryloyl-N-isopropylglycine isopropyl ester (A1-2) (0.22 mol) was obtained as a substantially colorless transparent liquid in the same manner as in Synthesis Example 1, except that N-methylglycine methyl ester hydrochloride was replaced with N-isopropylglycine isopropyl ester hydrochloride (reagent, available from Tokyo Chemical Industry Co., Ltd.). The purity thereof was 98.5% by mass.

Note that, a molecular weight of N-acryloyl-N-isopropylglycine isopropyl ester (A1-2) was 213.2.

Synthesis Example 3

Synthesis of N-acryloyl-N-isopropylglycine methyl ester (A1-3)

Targeted N-acryloyl-N-isopropylglycine methyl ester (A1-3) (0.22 mol) was obtained as a substantially colorless transparent liquid in the same manner as in Synthesis Example 1, except that N-methylglycine methyl ester hydrochloride was replaced with N-isopropylglycine methyl ester hydrochloride (reagent, available from Tokyo Chemical Industry Co., Ltd.). The purity thereof was 98.5% by mass.

Note that, a molecular weight of N-acryloyl-N-isopropylglycine methyl ester (A1-3) was 185.2.

Synthesis Example 4

Synthesis of N-acryloyl-N-methylalanine methyl ester (A1-4)

Targeted N-acryloyl-N-methylalanine methyl ester (A1-4) (0.22 mol) was obtained as a substantially colorless transparent liquid in the same manner as in Synthesis Example 1, except that N-methylglycine methyl ester hydrochloride was replaced with N-methylalanine methyl ester hydrochloride (reagent, available from Tokyo Chemical Industry Co., Ltd.). The purities thereof was 98.5% by mass.

Note that, a molecular weight of N-acryloyl-N-methylalanine methyl ester (A1-4) was 171.2.

Synthesis Example 5

Synthesis of N-acryloyl-N-methylglycine isopropyl ester (A1-5)

Targeted N-acryloyl-N-methylglycine isopropyl ester (A1-5) (0.22 mol) was obtained as a substantially colorless transparent liquid in the same manner as in Synthesis Example 1, except that N-methylglycine methyl ester hydrochloride was replaced with N-methylglycine isopropyl ester hydrochloride (reagent, available from Tokyo Chemical Industry Co., Ltd.). The purity thereof was 98.5% by mass.

Note that, a molecular weight of N-acryloyl-N-methylglycine isopropyl ester (A1-5) was 185.2.

Synthesis Example 6

Synthesis of N-acryloyl-N-methylalanine isopropyl ester (A1-6)

Targeted N-acryloyl-N-methylalanine isopropyl ester (A1-6) (0.22 mol) was obtained as a substantially colorless transparent liquid in the same manner as in Synthesis Example 1, except that N-methylglycine methyl ester hydrochloride was replaced with N-methylalanine isopropyl ester hydrochloride (reagent, available from Tokyo Chemical Industry Co., Ltd.). The purity thereof was 98.5% by mass.

Note that, a molecular weight of N-acryloyl-N-methylalanine isopropyl ester (A1-6) was 199.2.

Synthesis Example 7

Synthesis of ethyl N-acryloylpiperidine-4-carboxylate (A1-7)

Targeted ethyl N-acryloylpiperidine-4-carboxylate (A1-7) (0.27 mol) was obtained as a substantially colorless transparent liquid in the same manner as in Synthesis Example 1, except that N-methylglycine methyl ester hydrochloride was replaced with ethyl piperidine-4-carboxylate (reagent, available from Tokyo Chemical Industry Co., Ltd.). The purity thereof was 99.2% by mass.

Note that, a molecular weight of ethyl N-acryloylpiperidine-4-carboxylate (A1-7) was 211.3. Ethyl N-acryloylpiperidine-4-carboxylate (A1-7) is a known compound (CAS registry number: 845907-79-1).

Example 1

<Production of Composition>

A composition of Example 1 was produced by adding 69.9% by mass of A1-1, 15.0% by mass of A2-4, 5.0% by mass of A3-3, 10.0% by mass of a polymerization initiator (Esacure ONE, available from IGM), and 0.1% by mass of a polymerization inhibitor (METHOQUINONE, available from Seiko Chemical Co., Ltd.) in this order, stirring the resultant mixture for 2 hours, and visually confirming that there was no undissolved component remained, followed by removing coarse particles through filtration with a membrane filter.

Examples 2 to 26 and Comparative Examples 1 to 10

Compositions of Examples 2 to 26 and Comparative Examples 1 to 10 were each produced in the same manner as in Example 1, except that the composition and the amounts (% by mass) were changed as presented in Tables 2 to 5 below.

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Acrylamide compound (A1) | A1-1 | 69.9 | | | | | | | 69.9 | 74.9 | 54.9 |
| | A1-2 | | 69.9 | | | | | | | | |
| | A1-3 | | | 69.9 | | | | | | | |
| | A1-4 | | | | 69.9 | | | | | | |
| | A1-5 | | | | | 69.9 | | | | | |
| | A1-6 | | | | | | 69.9 | | | | |
| | A1-7 | | | | | | | 69.9 | | | |
| | A1-8 | | | | | | | | | | |
| | A1-9 | | | | | | | | | | |
| Polyfunctional polymerizable compound including alkylene oxide group (A2) | A2-1 | | | | | | | | | | |
| | A2-2 | | | | | | | | | 10.0 | |
| | A2-3 | | | | | | | | 15.0 | | |
| | A2-4 | 15.0 | 15.0 | 15.0 | 15.0 | 15.0 | 15.0 | 15.0 | | | 30.0 |
| | A2-5 | | | | | | | | | | |
| Polyfunctional polymerizable compound (A3) different from (A2) | A3-1 | | | | | | | | | 5.0 | |
| | A3-2 | | | | | | | | | | 5.0 |
| | A3-3 | 5.0 | 5.0 | 5.0 | 5.0 | 5.0 | 5.0 | 5.0 | 5.0 | | |
| | A3-4 | | | | | | | | | | |
| Polymerization initiator | | 10.0 | 10.0 | 10.0 | 10.0 | 10.0 | 10.0 | 10.0 | 10.0 | 10.0 | 10.0 |
| Polymerization inhibitor | | 0.1 | 0.1 | 0.1 | 0.1 | 0.1 | 0.1 | 0.1 | 0.1 | 0.1 | 0.1 |
| Total (mass %) | | 100.0 | 100.0 | 100.0 | 100.0 | 100.0 | 100.0 | 100.0 | 100.0 | 100.0 | 100.0 |

TABLE 3

| | | Example | | | | | | | | | |
|---|---|---|---|---|---|---|---|---|---|---|---|
| | | 11 | 12 | 13 | 14 | 15 | 16 | 17 | 18 | 19 | 20 |
| Acrylamide compound (A1) | A1-1 | 44.9 | 54.9 | 60.9 | 53.9 | 56.9 | 52.9 | 52.9 | 52.9 | 69.9 | 69.9 |
| | A1-2 | | | | | | | | | | |
| | A1-3 | | | | | | | | | | |
| | A1-4 | | | | | | | | | | |
| | A1-5 | | | | | | | | | | |
| | A1-6 | | | | | | | | | | |
| | A1-7 | | | | | | | | | | |
| | A1-8 | | | | | | | | | | |
| | A1-9 | | | | | | | | | | |

TABLE 3-continued

|  |  | Example | | | | | | | | | |
|---|---|---|---|---|---|---|---|---|---|---|---|
|  |  | 11 | 12 | 13 | 14 | 15 | 16 | 17 | 18 | 19 | 20 |
| Polyfunctional polymerizable compound including alkylene oxide group (A2) | A2-1 |  |  |  |  |  |  |  | 33.0 |  |  |
|  | A2-2 |  |  |  |  |  |  | 33.0 |  |  |  |
|  | A2-3 |  |  |  |  |  |  |  |  |  |  |
|  | A2-4 | 25.0 | 25.0 | 8.0 | 32.0 | 30.0 | 32.0 |  |  |  | 15.0 |
|  | A2-5 |  |  |  |  |  |  |  |  | 15.0 |  |
| Polyfunctional polymerizable compound (A3) different from (A2) | A3-1 | 20.0 | 10.0 | 21.0 | 4.0 | 3.0 | 5.0 | 4.0 | 4.0 | 5.0 |  |
|  | A3-2 |  |  |  |  |  |  |  |  |  |  |
|  | A3-3 |  |  |  |  |  |  |  |  |  |  |
|  | A3-4 |  |  |  |  |  |  |  |  |  | 5.0 |
| Polymerization initiator |  | 10.0 | 10.0 | 10.0 | 10.0 | 10.0 | 10.0 | 10.0 | 10.0 | 10.0 | 10.0 |
| Polymerization inhibitor |  | 0.1 | 0.1 | 0.1 | 0.1 | 0.1 | 0.1 | 0.1 | 0.1 | 0.1 | 0.1 |
| Total (mass %) |  | 100.0 | 100.0 | 100.0 | 100.0 | 100.0 | 100.0 | 100.0 | 100.0 | 100.0 | 100.0 |

TABLE 4

|  |  | Example | | | | | |
|---|---|---|---|---|---|---|---|
|  |  | 21 | 22 | 23 | 24 | 25 | 26 |
| Acrylamide compound (A1) | A1-1 | 56.9 | 44.9 | 59.9 | 59.9 | 44.9 | 59.9 |
|  | A1-2 |  |  |  |  |  |  |
|  | A1-3 |  |  |  |  |  |  |
|  | A1-4 |  |  |  |  |  |  |
|  | A1-5 |  |  |  |  |  |  |
|  | A1-6 |  |  |  |  |  |  |
|  | A1-7 |  |  |  |  |  |  |
|  | A1-8 |  |  |  |  |  |  |
|  | A1-9 |  |  |  |  |  |  |
| Polyfunctional polymerizable compound including alkylene oxide group (A2) | A2-1 | 15.0 |  |  |  |  |  |
|  | A2-2 |  | 10.0 |  |  | 10.0 | 5.0 |
|  | A2-3 |  |  |  |  |  |  |
|  | A2-4 |  | 15.0 | 15.0 | 15.0 | 15.0 | 10.0 |
|  | A2-5 | 15.0 |  |  |  |  |  |
| Polyfunctional polymerizable compound (A3) different from (A2) | A3-1 | 3.0 | 20.0 | 10.0 | 10.0 | 10.0 | 10.0 |
|  | A3-2 |  |  |  |  |  |  |
|  | A3-3 |  |  |  | 5.0 | 10.0 |  |
|  | A3-4 |  |  | 5.0 |  |  | 5.0 |
| Polymerization initiator |  | 10.0 | 10.0 | 10.0 | 10.0 | 10.0 | 10.0 |
| Polymerization inhibitor |  | 0.1 | 0.1 | 0.1 | 0.1 | 0.1 | 0.1 |
| Total (mass %) |  | 100.0 | 100.0 | 100.0 | 100.0 | 100.0 | 100.0 |

TABLE 5

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Acrylamide compound (A1) | A1-1 | 89.9 | 59.9 | 69.9 |  | 69.9 | 59.9 |  |  |  |  |
|  | A1-2 |  |  |  | 59.9 |  |  |  |  |  |  |
|  | A1-3 |  |  |  |  |  |  |  |  |  |  |
|  | A1-4 |  |  |  |  |  |  |  |  |  |  |
|  | A1-5 |  |  |  |  |  |  |  |  |  |  |
|  | A1-6 |  |  |  |  |  |  |  |  |  |  |
|  | A1-7 |  |  |  |  |  |  |  |  |  |  |
|  | A1-8 |  |  |  |  |  |  |  | 89.9 |  | 69.9 |
|  | A1-9 |  |  |  |  |  |  | 89.9 |  | 69.9 |  |
| Polyfunctional polymerizable compound including alkylene oxide group (A2) | A2-1 |  |  |  |  |  |  |  |  |  |  |
|  | A2-2 |  |  |  |  | 30.0 |  |  |  |  |  |
|  | A2-3 |  |  | 30.0 |  |  |  |  |  |  |  |
|  | A2-4 |  | 30.0 |  |  |  |  |  |  | 15.0 | 15.0 |
|  | A2-5 |  |  |  |  |  |  |  |  |  |  |
| Polyfunctional polymerizable compound (A3) different from (A2) | A3-1 |  |  |  | 20.0 |  |  |  |  |  |  |
|  | A3-2 |  |  |  |  |  | 20.0 |  |  |  |  |
|  | A3-3 |  |  |  |  |  |  |  |  | 5.0 | 5.0 |
|  | A3-4 |  |  |  |  |  |  |  |  |  |  |
| Polymerization initiator |  | 10.0 | 10.0 | 10.0 | 10.0 | 10.0 | 10.0 | 10.0 | 10.0 | 10.0 | 10.0 |
| Polymerization inhibitor |  | 0.1 | 0.1 | 0.1 | 0.1 | 0.1 | 0.1 | 0.1 | 0.1 | 0.1 | 0.1 |
| Total (mass %) |  | 100.0 | 100.0 | 100.0 | 100.0 | 100.0 | 100.0 | 100.0 | 100.0 | 100.0 | 100.0 |

<Production of Cured Product>

Each of the obtained compositions was sandwiched between a pair of glass plates in the manner that a film thickness of the composition was to be 1 mm. The composition in the above-described state was irradiated with active energy rays at light dose of 10,000 mJ/cm$^2$ by means of an active energy ray irradiation device (LightHammer6 D bulb, available from Heraeus Holding), to thereby produce a cured product.

<Evaluation of Stretchability>

A tensile test was performed on each of the obtained cured products under the following conditions, and stretchability (%) was calculated according to the formula (1) below, and the stretchability was evaluated based on the evaluation criteria below. The results are presented in Tables 6 to 9.

[Test Conditions]
Tensile tester: Autograph AGS-5kNX (available from Shimadzu Corporation)
Tensile speed: 20 mm/min
Sample: JIS K6251 dumbbell (No. 6)

$$\text{Stretchability} = \frac{\text{Length after tensile test} - \text{Length before tenstile test}}{\text{Length before tenstile test}} \times 100 \tag{1}$$

[Evaluation Criteria]
Good: 150% or greater
Fair: 100% or greater but less than 150%
Poor: less than 100%

<Evaluation of Abrasion Resistance>

A steel wool test was performed on each of the obtained cured product under the following conditions, haze of the sample was measured by a hazemeter (DIRECT READING HAZEMETER, available from TOYO SEIKI CO., LTD.) before and after the test, the change in the haze was determined, and abrasion resistance was evaluated based on the following evaluation criteria. The results are presented in Tables 6 to 9.

[Test Conditions]
Steel wool: #0000
Load: 500 g
The number of forward and backward motions: 100 times

[Evaluation Criteria]
Excellent: The haze change was less than 3%.
Good: The haze change was 3% or greater but less than 10%.
Fair: The haze change was 10% or greater but less than 15%.
Poor: The haze change was 15% or greater.

TABLE 6

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Stretchability | Good | Good | Good | Good | Good | Good | Fair | Fair | Fair | Good |
| Abrasion resistance | Good | Excellent | Excellent | Good | Good | Good | Good | Good | Good | Fair |

TABLE 7

|  | Example | | | | | | | | | |
| --- | --- | --- | --- | --- | --- | --- | --- | --- | --- | --- |
|  | 11 | 12 | 13 | 14 | 15 | 16 | 17 | 18 | 19 | 20 |
| Stretchability | Good | Good | Fair | Good | Good | Good | Good | Fair | Good | Good |
| Abrasion resistance | Good | Fair | Good | Fair | Fair | Fair | Fair | Fair | Fair | Fair |

TABLE 8

| | Example | | | | | |
|---|---|---|---|---|---|---|
| | 21 | 22 | 23 | 24 | 25 | 26 |
| Stretchability | Good | Good | Good | Good | Good | Good |
| Abrasion resistance | Fair | Good | Good | Excellent | Good | Good |

TABLE 9

| | Comparative Example | | | | | | | | | |
|---|---|---|---|---|---|---|---|---|---|---|
| | 1 | 2 | 3 | 4 | 5 | 6 | 7 | 8 | 9 | 10 |
| Stretchability | Good | Good | Poor | Fair | Poor | Poor | Poor | Poor | Poor | Poor |
| Abrasion resistance | Poor | Poor | Good | Poor | Good | Poor | Poor | Good | Good | Good |

For example, embodiments of the present disclosure are as follows.

<1> A composition including:
an acrylamide compound having a molecular weight of 150 or greater but 250 or less (A1);
a polyfunctional polymerizable compound including an alkylene oxide group (A2); and
a polyfunctional polymerizable compound (A3) different from the polyfunctional polymerizable compound (A2).

<2> The composition according to <1>,
wherein the acrylamide compound (A1) is represented by General Formula (1) below, or General Formula (2) below, or both, $$CH_2=CH-CO-N(R^1)-R^2-CO-O-R^3 \quad \text{General Formula (1)}$$

where, in General Formula (1), $R^1$ is a hydrogen atom or a straight chain or branched alkyl group having from 1 through 4 carbon atoms, $R^2$ is a straight chain or branched alkylene group having from 1 through 4 carbon atoms, and $R^3$ is a straight chain or branched alkyl group having from 1 through 4 carbon atoms, with the proviso that a total number of carbon atoms of $R^1$, $R^2$, and $R^3$ is from 2 through 6, General Formula (2)

where, in General Formula (2), a ring X is a cyclic structure that includes a nitrogen atom and has from 2 through 5 carbon atoms, $R^4$ is a single bond or a straight chain or branched alkylene group having from 1 through 3 carbon atoms, and W is a straight chain or branched alkyl group having from 1 through 3 carbon atoms, with the proviso that a total number of carbon atoms of the ring X, $R^4$, and $R^5$ is from 3 through 6.

<3> The composition according to <2>,
wherein the acrylamide compound (A1) is represented by General Formula (1) and $R^3$ is an alkyl group having from 1 through 2 carbon atoms.

<4> The composition according to any one of <1> to <3>, wherein the amount of the acrylamide compound (A1) is 20.0% by mass or greater but 98.0% by mass or less relative to a total amount of the composition.

<5> The composition according to any one of <1> to <4>, wherein an amount of the polyfunctional polymerizable compound (A2) is 10% by mass or greater but 30% by mass or less.

<6> The composition according to any one of <1> to <5>, wherein an alkylene oxide chain of the polyfunctional polymerizable compound (A2) includes 3 alkylene oxide repeating units or greater but 13 alkylene oxide repeating units or less.

<7> The composition according to any one of <1> to <6>, wherein an amount of the polyfunctional polymerizable compound (A3) is 5% by mass or greater but 20% by mass or less.

<8> The composition according to any one of <1> to <7>, further including a polymerization initiator.

<9> The composition according to any one of <1> to <8>, wherein the composition is an active energy ray-curable composition.

<10> The composition according to any one of <1> to <9>, wherein the composition is an inkjet composition.

<11> A storage container including:
a container; and
the composition according to any one of <1> to <10>, where the composition is stored in the container.

<12> A two-dimensional or three-dimensional image forming apparatus, the apparatus including:
a container, in which the composition according to any one of <1> to <10> is stored;
an application unit configured to apply the composition; and
a curing unit configured to cure the composition.

<13> The apparatus according to <12>,
wherein the curing unit is a UV-LED configured to emit ultraviolet rays having a peak at a wavelength of 365 nm or longer but 405 nm or shorter.

<14> A two-dimensional or three-dimensional image forming method, the method including:
applying the composition according to any one of <1> to <10>; and curing the composition.

<15> The method according to <14>,
wherein the curing includes applying ultraviolet rays having a peak at a wavelength of 365 nm or longer but 405 nm or shorter using a UV-LED.

<16> A cured product obtained with the composition according to any one of <1> to <10>.

<17> A stretched article including:
the cured product according to <16> which is stretched.

<18> A decorated article including:
a base; and
the cured product according to <16> on the base.

The composition according to any one of <1> to <10>, the storage container according to <11>, the two-dimensional or three-dimensional image forming apparatus according to <12> or <13>, the two-dimensional or three-dimensional image forming method according to <14> or <15>, the cured product of the composition according to <16>, the formed article of the cured product according to <17>, and the decorated article of the cured product according to <18> can solve the above-described various problems existing in the art and can achieve the object of the present disclosure.

What is claimed is:

1. A composition comprising:
an acrylamide compound (A1) having a molecular weight of 150 or greater but 250 or less;
a polyfunctional polymerizable compound (A2) including an alkylene oxide group; and
a polyfunctional polymerizable compound (A3) different from the polyfunctional polymerizable compound (A2),
wherein the acrylamide compound (A1) is represented by General Formula (1) below, or General Formula (2) below, or both, $CH_2$=CH—CO—N($R^1$)—$R^2$—CO—O—$R^3$   General Formula (1)

where, in General Formula (1), $R^1$ is a hydrogen atom or a straight chain or branched alkyl group having from 1 through 4 carbon atoms, $R^2$ is a straight chain or branched alkylene group having from 1 through 4 carbon atoms, and $R^3$ is a straight chain or branched alkyl group having from 1 through 4 carbon atoms, with the proviso that a total number of carbon atoms of $R^1$, $R^2$, and $R^3$ is from 2 through 6, General Formula (2)

where, in General Formula (2), a ring X is a cyclic structure that includes a nitrogen atom and has from 2 through 5 carbon atoms, $R^4$ is a single bond or a straight chain or branched alkylene group having from 1 through 3 carbon atoms, and $R^5$ is a straight chain or branched alkyl group having from 1 through 3 carbon atoms, with the proviso that a total number of carbon atoms of the ring X, $R^4$, and $R^5$ is from 3 through 6; and
wherein the polyfunctional polymerizable compound (A2) comprises a methacrylate group, an acrylate group, or both.

2. The composition according to claim 1,
wherein the acrylamide compound (A1) is represented by General Formula (1) and $R^3$ is an alkyl group having from 1 through 2 carbon atoms.

3. The composition according to claim 1,
wherein an amount of the polyfunctional polymerizable compound (A2) is 10% by mass or greater but 30% by mass or less.

4. The composition according to claim 1,
wherein an alkylene oxide chain of the polyfunctional polymerizable compound (A2) includes 3 alkylene oxide repeating units or greater but 13 alkylene oxide repeating units or less.

5. The composition according to claim 1,
wherein an amount of the polyfunctional polymerizable compound (A3) is 5% by mass or greater but 20% by mass or less.

6. The composition according to claim 1,
wherein the composition is an active energy ray-curable composition.

7. A storage container comprising:
a container; and
the composition according to claim 1, where the composition is stored in the container.

8. A two-dimensional or three-dimensional image forming apparatus, the apparatus comprising:
a container, in which the composition according to claim 1 is stored;
an application unit configured to apply the composition; and
a curing unit configured to cure the composition.

9. A two-dimensional or three-dimensional image forming method, the method comprising:
applying the composition according to claim 1; and
curing the composition.

10. A cured product obtained with the composition according to claim 1.

11. A stretched article comprising:
the cured product according to claim 10 which is stretched.

12. A decorated article comprising:
a base; and
the cured product according to claim 10 on the base.

* * * * *